United States Patent [19]

Price

[11] Patent Number: 5,147,918
[45] Date of Patent: Sep. 15, 1992

[54] LOW WEAR POLYAMIDE COMPOSITIONS CONTAINING ALUMINOSILICATE CERAMIC FIBER

[75] Inventor: Karen L. Price, Florence, Ky.

[73] Assignee: Hoechst Celanese Corporation, Somerville, N.J.

[21] Appl. No.: 713,522

[22] Filed: Jun. 12, 1991

[51] Int. Cl.⁵ .............................................. C08K 3/34
[52] U.S. Cl. .................................. 524/442; 524/443; 524/493; 524/607
[58] Field of Search ................ 524/442, 607, 443, 493

[56] References Cited

U.S. PATENT DOCUMENTS

| | | | |
|---|---|---|---|
| 3,068,122 | 12/1962 | Cline et al. | 117/138 |
| 3,676,287 | 7/1972 | Flautt et al. | 161/140 |
| 3,705,125 | 12/1972 | Preston et al. | 260/37 |
| 4,188,454 | 2/1980 | Foley et al. | 428/391 |
| 4,312,911 | 1/1982 | Smith et al. | 428/224 |
| 4,391,951 | 7/1983 | Scheetz | 525/166 |
| 4,423,113 | 12/1983 | Olive et al. | 428/389 |
| 4,528,304 | 7/1985 | Yoshimura et al. | 524/442 |
| 4,728,573 | 3/1988 | Temple | 428/378 |
| 4,804,703 | 2/1989 | Subramanian | 524/442 |

OTHER PUBLICATIONS

"Fiberfrax ® Chopped Fiber" Product Application Data Sheet, Sohio Carborundum, ©1986.
"Fiberfrax ® Chopped Fiber" Product Specifications, Sohio Carborundum, ©1986.
"Fiberfrax ® 6000 RPS Fiber" Product Specifications, Standard Oil, ©1986.
"Fiberfrax ® Milled Fiber" Product Specifications, Sohio Carborundum, ©1986.

*Primary Examiner*—Paul R. Michl
*Assistant Examiner*—Tae H. Yoon

[57] ABSTRACT

A polyamide composition, which exhibits improved strength properties and low wear properties at elevated temperatures, includes an effective amount of an aluminosilicate ceramic fiber. One preferred composition includes nylon 66 (i.e., a condensation product of adipic acid and hexamethylenediamine) and between 10 and 20 weight percent of an aluminosilicate ceramic fiber, comprising about 43 weight percent $Al_2O_3$ and about 54 weight percent $SiO_2$. Due to their enhanced strength and wear properties at elevated temperatures, the compositions of the present invention find particular utility as molded components in mechanisms susceptible to high temperature.

30 Claims, No Drawings

LOW WEAR POLYAMIDE COMPOSITIONS CONTAINING ALUMINOSILICATE CERAMIC FIBER

FIELD OF THE INVENTION

The present invention relates generally to polyamide molding compositions. More specifically, the invention relates to polyamide molding compositions that exhibit not only improved strength properties at elevated temperatures but also low wear properties. In addition, these polyamide molding compositions have excellent processing characteristics.

The molding compositions of the present invention include a polyamide and an aluminosilicate ceramic fiber which combine to form a versatile molding composition having exceptional strength, wear, and processability characteristics.

BACKGROUND OF THE INVENTION

At low temperatures, polyamides can generally be characterized as having good strength properties (e.g., high tensile strength and toughness, outstanding resistance to chemicals and abrasion, and a low coefficient of friction). Because of these strength properties, polyamides are used in numerous engineering applications that typically do not involve elevated temperatures (i.e., temperatures above 80° C.).

At elevated temperatures (i.e., temperatures above 80° C.), however, polyamides suffer from a reduction in their strength properties. As a consequence of the debilitating effect of temperature, various ingredients have been blended with polyamides in order to yield polyamide compositions that exhibit commercially acceptable strength properties at elevated temperatures. For example, glass products are known to have good strength properties (even at elevated temperatures) and, as a result, have been incorporated into polyamide compositions to improve the strength properties of the resulting compositions which are to be utilized in high temperature environments.

Yet, when modifying a polymer in order to improve one property, e.g., creep resistance at high temperatures, other desirable properties usually suffer. Polyamides and polyamide compositions are no different. That is, although polyamide-glass compositions exhibit improved strength properties at elevated temperatures, they inevitably suffer from poor wear properties. Accordingly, these compositions cannot be utilized in wear applications such as couplings, where good wear properties as well as high strength at elevated temperatures are critical.

Like other strength additives, glass is an extremely "hard" material, and the friction action caused by its presence in a polyamide blend leads to poor wear properties of the resulting blend. In addition, a blend containing a strength additive can also effectuate the undesirable wear of corresponding parts of an apparatus. Hence, the incorporation of a strength additive in a polyamide composition accentuates or compounds the wear problems of any multicomponent apparatus. In this regard, glass as well as other strength additives tend to greatly impair the wear properties of any resulting polyamide composition due to the strength additive's hardness or grit-like characteristics—the very characteristics that seemingly improve the strength of the composition.

Further, many reinforcing type fibers, structures, or agents cannot be commercially utilized in polyamide compositions because of other problems as well. For example, a number of reinforcing agents present major processing complications. In particular, a strength improving additive or component such as an aramid, i.e., an aromatic polyamide fiber, tends to form problematic fiber clumps during processing or blending with polyamides resulting in not only processing problems but non-homogeneous compositions with poor strength properties. Hence, the poor processing characteristics of these reinforcing agents discourages their commercial use in polyamide compositions.

Thus, in addition to the requirements of high strength and low wear properties at elevated temperatures, commercially acceptable polyamide compositions must also exhibit desirable processability characteristics. That is, during the compounding or blending of the molding composition's ingredients, the polyamide must be capable of readily mixing with the other employed ingredients. Otherwise, there is an elevated risk that the final composition will be non-homogeneous. As a consequence of this non-homogeneity, the resulting molded part would suffer from localized weaknesses which would, in turn, render the part commercially unacceptable.

Thus, while the reinforced polyamides known to date may provide improved strength properties at elevated temperatures (versus unreinforced polyamides), they inevitably suffer from poor wear properties and undesirable processability characteristics. Accordingly, the present invention is directed to achieving improvements to the strength, wear, and processability characteristics of polyamide compositions.

SUMMARY OF THE INVENTION

Broadly, the present invention is directed to polyamide molding compositions which include a ceramic fiber material. Surprisingly, it has now been discovered that a polyamide composition comprising a particular ceramic fiber material has enhanced high temperature strength properties as well as low wear properties. Furthermore, the ingredients employed in this composition are completely comparable and have excellent processability characteristics when blended, thus resulting in a homogeneous polyamide composition having uniform properties.

The composition of the present invention comprises a polyamide and a ceramic fiber. More specifically, the molding compositions of the present invention include a polyamide and an aluminosilicate ceramic fiber. As one skilled in the art can appreciate, the compositions of this invention may also include other components, for example, fillers, modifiers, stabilizing agents, coupling agents, colorants, etcetera, depending on the desired properties for a particular end use application.

Preferably, the polyamide employed in the present invention is a nylon ($C_6H_{11}NO$) such as nylon 66 (a condensation product of hexamethylenediamine and adipic acid). Nylon 66 is the most preferred type of nylon among the common nylons currently available (e.g., nylon 6,6, nylon 6 and nylon 6,12) because it has the highest melting point, the highest tensile strength, the highest flexural modulus, and the best creep resistance. The ceramic fiber employed in the present invention is an aluminosilicate ceramic fiber comprising high purity alumina ($AL_2O_3$) and silica ($SiO_2$).

The compositions of this invention exhibit excellent strength properties, for example, high tensile strength, stiffness, heat deflection temperature and creep resistance, as well as low wear properties vis-a-vis known polyamide-strength additive compositions (e.g., polyamide-glass compositions). Moreover, the compositions of the present invention have superior processability characteristics versus known reinforced polyamide compositions (e.g., polyamide-aramid compositions). Accordingly, the molding compositions of this invention find particular commercial utility in mechanisms susceptible to elevated temperature and wear applications, for example as in window valence mechanisms, breaking systems, bearings, couplings, gears and various other mechanical devices. Of course, the compositions of this invention may be employed in any end use environment which demands uniform high strength and low wear characteristics.

These advantages, and others, will become more apparent from the following detailed description of the compositions according to the present invention.

DETAILED DESCRIPTION OF THE PREFERRED EXEMPLARY EMBODIMENTS

By employing the additives as will be described below, polyamide compositions for molding applications can be easily manufactured. Furthermore, these compositions exhibit exceptional strength properties as well as superior wear properties at elevated temperatures (i.e., temperatures above 80° C.).

The compositions o the present invention comprise a polyamide and an effective amount of a ceramic fiber. In general, the amount of polyamide utilized is between about 80 and about 95 weight percent, based on the total weight of the molding composition. And, the amount of ceramic fiber is generally between about 5 and about 20 weight percent, based on the total weight of the molding composition. As one skilled in the art will appreciate, the optimum proportions of the various ingredients will depend on the particular ingredients utilized and the particular molding composition desired.

A preferred group of polyamides intended to be utilized in accordance with this invention are compounds having the chemical formula $(C_6H_{11}NO)_n$, i.e., nylon. A particularly preferred nylon is nylon 66 which is a condensation product of adipic acid and hexamethylenediamine, and which has the following characteristics: melting point of about 255°–265° C., tensile strength of about 8000–13700 psi, tensile modulus of about 410,000 to 470,000 psi, and a heat deflection temperature of about 80° C.

Representative of suitable polyamides are nylon 66, nylon 6, nylon 6,12, nylon 4,6, nylon 6,10 as well as a variety of other polyamides and blends of polyamides.

A particularly preferred nylon 6,6 is commercially available from Hoechst Celanese under the tradename CELANESE® NYLON 100 series, having the following properties: a melting point of about 257° C., a tensile strength of about 12,000 psi, a flexural modulus of about 420,000 psi, and a heat deflection temperature of about 77° C. at 264 psi.

According to the present invention, a ceramic fiber in an amount of from about 5 to about 35 weight percent (based on the total weight of the molding composition) may be utilized so as to yield a polyamide composition having superior strength and wear properties at elevated temperatures (i.e., temperatures above 80° C.). Preferably, the amount of ceramic fiber utilized is between about 10 and about 15 weight percent, and most preferably about 12 weight percent (with the remainder substantially polyamide).

The ceramic fiber to be blended with the polyamide in accordance with the present invention is an aluminosilicate ceramic fiber. Commercial aluminosilicate ceramic fibers are readily available. Generally, the composition of these fibers is high purity alumina ($Al_2O_3$) and silica ($SiO_2$), with traces of other inorganic materials.

Typically, the aluminosilicate ceramic fibers that may be employed in the present invention are commercially produced by one of three methods: melting/blowing, melting/spinning, or drawing the fiber from a chemical gel. In the two melting methods, an electric arc furnace is charged with aluminum-bearing ores and high purity silica to form a molten solution. The molten solution is then poured in stream form and subjected to a high-pressure jet in the melting/blowing method, or subjected to a series of spinning wheels in the melting/spinning method. In this manner, the molten stream is effectively broken into droplets, which cool rapidly to form either a head or tail. The tail is broken off to form the fiber, while the head becomes unfiberized particles.

In the chemical gel production method, an alumina/silica gel is formed and then drawn into a fiber, which, subsequently, undergoes further processing to derive the final fiber. The final fiber product is then specifically engineered to meet the requirements of particular end use applications.

A preferred aluminosilicate ceramic fiber used in accordance with the present invention is commercially available from Sohio Engineered Materials, Co. under the tradename FIBERFRAX®. FIBERFRAX® ceramic fiber is characterized as an inorganic composition of high purity alumina and silica, which has a melting point of about 3200° F. to 3300° F.

A particularly preferred aluminosilicate ceramic fiber used in accordance with the present invention is commercially available from Sohio Engineered Materials, Co. under the tradename FIBERFRAX® HSA. FIBERFRAX® HSA is a discontinuous fiber and is manufactured by atomizing a molten ceramic stream using high pressure air impingement or spinning wheels. The processing of this fiber results in an aluminosilicate which is a thixotrope.

FIBERFRAX® HSA has a white to light gray color and an average nominal diameter of about 0.8 to 1.2 microns. The average length of the FIBERFRAX® HSA is about 100 microns, with a surface area of about 3.0 m²/g. In addition, the FIBERFRAX® HSA has a fiber content of greater than about 95%, a specific gravity of about 2.7 grams per cubic meter, a negative surface charge, a pH of about 6 to 7, and a normal packing density of about 6 to 12 pounds per cubic foot. The chemical composition of Fiberfrax® HSA is as follows:

| | |
|---|---|
| $Al_2O_3$ | 43.4 wt. % |
| $SiO_2$ | 53.9 wt. % |
| $Fe_2O_3$ | 0.8 wt. % |
| $TiO_2$ | 1.6 wt. % |
| $Na_2O$ | 0.1 wt. % |
| Other traces | 0.1 wt. % |

All of these characteristics provide for a uniform (homogeneous) polyamide-aluminosilicate ceramic fiber composition having high strength and low wear properties at elevated temperatures (i.e., above 80° C.).

It has been discovered that FIBERFRAX ® HSA ceramic fibers are particularly well suited for use in the present invention because they provide good handling and processing characteristics as well as improving the properties of the resulting nylon compositions.

Another preferred aluminosilicate ceramic fiber is available from Sohio Engineered Materials Co. under the tradename FIBERFRAX ® EF 121. Fiberfrax EF 121 is white to light gray in color and has an average nominal diameter of about 2-3 microns. The average fiber length is about 70 microns with a fiber index of about 75. It has a melting point of about 3160° F., a specific gravity of about $2.73 g/m^3$, a tensile strength of about $2.5 \times 10^5$ psi and a tensile modulus of about $13 \times 10^6$ psi The chemical composition of FIBERFRAX ® EF-121 is as follows:

| | |
|---|---|
| $Al_2O_3$ | 42.0-48.0 wt. % |
| $SiO_2$ | 49.0-55.0 wt. % |
| $Na_2O_3$ | 0.1 wt. % |
| $Fe_2O_3$ | 0.8 wt. % |
| $TiO_2$ | 1.6 wt. % |
| Other traces | 0.1 wt. % |
| Leachable chlorides | <10 ppm |

In another preferred embodiment of the present invention, the molding composition comprises a polyamide, an effective amount of an aluminosilicate ceramic fiber, and an effective amount of glass (e.g., glass fibers). Utilizing an aluminosilicate ceramic fiber along with a glass fiber as an additional reinforcement agent also yields a high strength composition at elevated temperatures. Moreover, this embodiment surprisingly exhibits low wear characteristics at elevated temperatures as long as the glass content is maintained at a low level (e.g., less than about 15 weight percent based on the weight of the total composition).

The glass materials that may be employed in the present invention are fibrous materials having a melting point of at least about 700° C., and are blendable or processable with polyamides and aluminosilicate ceramic fibers at a temperature of about 285° C. The fibers should preferably be made from E-type glass treated with a surface sizing compatible with the matrix resin in order to enhance handling of the fibers during compounding and to increase strength properties of the final composition. The preferred fiber length is from about 1/16 inch to about 1/12 inch with a fiber diameter of about 6 to 14 microns.

The preferred glass fibers which may be successfully employed in the present invention are commercially available from PPG, OCF & Certainteed under various tradenames.

A particularly preferred glass fiber is available from PPG under the tradename PPG 3540. It has been found that PPG 3540 glass fibers are particularly well suited for use in the present invention because they provide high strength and good property retention at elevated temperatures.

A preferred molding composition in accordance with the present invention comprises from about 55 to about 95 weight percent polyamide, from about 5 to about 35 weight percent aluminosilicate ceramic fiber, and from about 0 to about 15 weight percent glass fiber.

The ceramic and glass fibers which may be successfully employed in the present invention may be mixed with the polyamide in any expedient conventional blending fashion without experiencing processing difficulties. For example, the aluminosilicate and polyamide may be mixed by dry-blending in a tumble mixer followed by melt extrusion and conventional pelletizing, or by downstream feeding of an aluminosilicate into a melted polyamide followed by extrusion and pelletization. The glass fibers (in effective amounts according to the present invention) can be similarly processed in combination with or separate from the ceramic fiber. Thus, standard extrusion practices may be effectively used in compounding a homogeneous composition according to the present invention. The preferred processing practices are further described in the examples below.

Surprisingly, it has been found that an effective amount of an aluminosilicate ceramic fiber (and, additionally, glass fiber in limited amounts), blended with a polyamide yields an extremely strong, moldable, homogeneous composition with high strength properties at elevated temperatures (i.e., temperatures above 80° C.) as well as low wear characteristics in bearing applications. The compositions of the present invention exhibit excellent processability characteristics and significantly lower wear then glass fiber reinforced polyamides that do not contain aluminosilicate ceramic fibers in accordance with the present invention.

The invention will be further illustrated by way of the following non-limiting examples.

EXAMPLES

Polyamide compositions were prepared from the ingredients noted below in varying amounts to demonstrate the effect of such ingredients upon strength and wear properties of the resulting compositions. The following ingredients were employed in the amounts and combinations noted in Tables I, III and V.

A. Polyamide

Nylon 6,6 - NYLON N186 -Hoechst Celanese
Nylon 6,6 - NYLON 1003-1 -Hoechst Celanese
Nylon 6,6 - NYLON 1003-2 -Hoechst Celanese B. Ceramic fiber Aluminosilicate - FIBERFRAX ® EF 121 -Sohio Engineered Materials Company
Aluminosilicate - FIBERFRAX ® HSA -Sohio Engineered Materials Company C. Glass fiber E glass fibers - PPG 3540 - PPG EXAMPLES C1-C2 (Comparative formulations), AND E1-E2

Polyamide compositions were prepared (in 25 or 30 pound lots) by tumble blending either a glass fiber or an aluminosilicate ceramic fiber with a polyamide according to the formulations presented in Table I. Each dry blend was then extruded on a single screw vented extruder at about 510-540° F. and about 55-80 rpm, and subsequently pelletized. The pelletized samples were then injection molded (at about 510-560° F.) into test plaques on a reciprocating screw machine with a mold temperature of about 200° F.. Each nylon-aluminosilicate ceramic fiber formulation exhibited excellent blending and extrusion characteristics (e.g., no fiber clumping or non-homogeneity was evident).

The test plaques of the formulations were tested for the physical properties noted in Table II, and in accordance with the identified ASTM procedure.

TABLE I

| INGREDIENTS (wt %) | FORMULATIONS | | | |
|---|---|---|---|---|
| | C1 | C2 | E1 | E2 |
| Nylon 1003-1 | 100 | 87 | 88 | 80 |
| Glass | | 13 | | |
| Aluminosilicate: | | | | |
| Fiberfrax HSA | | | 12 | |
| Fiberfrax 121 | | | | 20 |

TABLE II

| PROPERTY | ASTM | FORMULATION | | | |
|---|---|---|---|---|---|
| | | C1 | C2 | E1 | E2 |
| Tensile Strength (psi) | D638 | 12,000 | 17,000 | 13,300 | 10,400 |
| % Elongation | D638 | 40-80 | 2-4 | 2.5 | 5.4 |
| Tensile Modulus (psi) | D638 | — | — | 870,000 | 680,000 |
| Flexural Strength (psi) | D790 | 17,000 | 27,500 | 14,600 | 18,600 |
| Flexural Modulus (psi) | D790 | 420,000 | 750,000 | 700,000 | 620,000 |
| Notched Izod (ft-lb/in) | D256 | 1.0 | 0.95 | 0.55 | 0.69 |
| HDT* @ 264 psi (°C.) | D648 | 77 | 243 | 235 | 218 |

*HDT = Heat Deflection Temperature

EXAMPLES C3–C5 (Comparative formulations) AND E3–E8

Additional polyamide compositions were prepared in the same manner as noted in Examples C1–C2 and E1–E2, and according to the formulations presented in Table III. Each nylon-aluminosilicate ceramic fiber formulation and nylon-aluminosilicate ceramic fiber -glass formulation exhibited excellent processability characteristics.

The test plaques of each formulation were tested for the properties noted in Table IV and Table VI, and in accordance with the identified ASTM procedure. In addition, wear testing at ambient temperature was conducted on each formulation according to the Taber Abrasion test (ASTM D4060-84). This test involves placing a weighted abrasive wheel on top of a 4 inch diameter, ⅛ inch thick, molded sample disk which is mounted to a turntable. The turntable is rotated and the weight loss per number of wear cycles is determined. The average weight loss of two samples is recorded as the taber abrasion number. For this testing a CS-17 abrasive wheel with a 1000 gram weight was used.

TABLE III

| INGREDIENTS (wt %) | FORMULATIONS | | | | | | |
|---|---|---|---|---|---|---|---|
| | C3 | C4 | C5 | E3 | E4 | E5 | E6 |
| Nylon: | | | | | | | |
| Nylon 1003-2 | 87 | | | 87 | 87 | | |
| N-186 | | 90 | 95 | | | 90 | 95 |
| Glass | 13 | 10 | 5 | | | | |
| Aluminosilicate: | | | | | | | |
| Fiberfrax HSA | | | | 13 | | 10 | 5 |
| Fiberfrax 121 | | | | | 13 | | |

TABLE IV

| PROPERTY | FORMULATION | | | | | | |
|---|---|---|---|---|---|---|---|
| | C3 | C4 | C5 | E3 | E4 | E5 | E6 |
| Tensile Strength (psi) | 16,500 | 16,400 | 13,600 | 14,700 | 11,000 | 11,000 | 10,900 |
| % Elongation | 2.6 | 5 | 13 | 3.4 | 3.0 | 19 | 15 |
| Tensile Modulus (psi) | 794,000 | 740,000 | 605,000 | 762,000 | 627,000 | 562,000 | 634,000 |
| Flexural Strength (psi) | 23,900 | 25,000 | 22,000 | 23,800 | — | 19,400 | 20,700 |
| Flexural Modulus (psi) | 820,000 | 660,000 | 580,000 | 810,000 | 630,000 | 540,000 | 620,000 |
| Notched Izod (ft-lb/in) | .70 | .91 | .79 | .59 | .51 | .78 | .85 |
| HDT* @ 264 psi (°C.) | 243 | 238 | 213 | 232 | 100 | 123 | 86 |
| Taber Abrasion (1000-10000 mg/m cycles wt. loss) | 14 | 9 | 7 | 5 | 4 | 5 | 4 |

TABLE V

| INGREDIENTS (Wt %) | FORMULATIONS | |
|---|---|---|
| | E7 | E8 |
| Nylon: | | |
| Nylon 1003-2 | 75 | 75 |
| Aluminosilicate: | | |
| Fiberfrax HSA | 13 | 25 |
| E glass | 12 | — |

TABLE VI

| PROPERTY | FORMULATION | |
|---|---|---|
| | E7 | E8 |
| Tensile Strength (psi) | 18,300 | 10,700 |
| % Elongation | 3.4 | 3.2 |
| Tensile Modulus (psi) | 941,000 | 783,000 |
| Flexural Strength (psi) | 29,500 | 19,020 |
| Flexural Modulus (psi) | 936,000 | 789,000 |
| Notched Izod (ft-lb/in) | 0.65 | 0.46 |
| HDT* @ 264 psi (°C.) | 237 | 224 |
| Taber Abrasion (1000-10000 mg/m cycles wt. loss) | 6 | 6 |

The above data in Tables I–VI demonstrate the effectiveness of employing an aluminosilicate ceramic fiber (composed of high purity alumina and silica) in the polyamide molding compositions of this invention to provide homogeneous compositions exhibiting high strength and low wear properties. For example, the enhanced wear property of the compositions of the present invention is especially evident from the Taber Abrasion values. That is, the compositions of the present invention exhibit a Taber Abrasion value of no greater than about 6 (which indicates excellent wear characteristics) while maintaining high strength characteristics (e.g., tensile strength greater than about 10,000 psi and a heat deflection temperature of greater than about 77° C.).

Therefore, while the invention has been described in connection with what is presently considered to be the most practical and preferred embodiments, it is to be understood that the invention is not to be limited to the disclosed embodiments, but on the contrary, is intended to cover various modifications and equivalent compositions included within the spirit and scope of the appended claims.

What is claimed is:

1. A polyamide molding composition exhibiting high mechanical strength and low wear properties comprising, based on the total weight of the composition:
   (a) between about 10 to about 15 weight percent of an aluminosilicate ceramic fiber comprising from about 43 to about 48 weight percent $Al_2O_3$ and from about 54 to about 50 weight percent of $SiO_2$ based on the total weight of the aluminosilicate ceramic fiber; and
   (b) between about 90 to about 85 weight percent of nylon 66; and
wherein the Taber Abrasion value of the polyamide molding composition is no greater than about 6 when subjected to ASTM test D4060–84 using a CS-17 abrasive wheel and 1000 gram weight.

2. The polyamide molding composition as in claim 1, wherein said aluminosilicate ceramic fiber is present in an amount of about 12 weight percent.

3. The polyamide molding composition as in claim 1, wherein the aluminosilicate ceramic fiber has a fiber content of greater than 95%.

4. The polyamide molding composition as in claim 1, wherein the tensile strength of the composition is greater than about 10,000 psi according to ASTM standard D638, has a flexural modulus of greater than about 450,000 psi according to ASTM standard D790, and a heat deflection temperature of greater than about 77° C. according to ASTM standard D648.

5. The polyamide molding composition as in claim 1, wherein the Taber Abrasion value of the composition is no greater than about 5 when subjected to ASTM test D4060–84 using a CS-17 abrasive wheel and 1000 gram weight.

6. The polyamide molding composition as in claim 1, wherein the aluminosilicate ceramic fiber has an average nominal diameter of about 0.8 to 1.2 microns and an average length of about 100 microns.

7. The polyamide molding composition as in claim 1, which further comprises at least one component selected from fillers, colorants, modifiers, and stabilizing agents.

8. A polyamide molding composition exhibiting high mechanical strength and low wear properties comprising, based on the total weight of the composition:
   (a) between about 5 to about 20 weight percent of an aluminosilicate ceramic fiber comprising from about 43 to about 48 weight percent $Al_2O_3$ and from about 54 to about 50 weight percent $SiO_2$ based on the total weight of the aluminosilicate ceramic fiber, and
   (b) between about 95 to about 80 weight percent of a polyamide.

9. The polyamide molding composition as in claim 8, wherein said polyamide is nylon 66.

10. The polyamide molding composition as in claim 8, wherein said aluminosilicate ceramic fiber is present in an amount of about 10 to about 20 weight percent.

11. The polyamide molding composition as in claim 8, wherein said aluminosilicate ceramic fiber is present in an amount of about 10 to about 15 weight percent.

12. The polyamide molding composition as in claim 8, wherein said aluminosilicate ceramic fiber is present in an amount of about 12 weight percent.

13. The polyamide molding composition as in claim 8, wherein the aluminosilicate ceramic fiber has a fiber content of greater than about 95%.

14. The polyamide molding composition as in claim 8, wherein the tensile strength of the composition is greater than about 10,000 psi according to ASTM standard D638.

15. The polyamide molding composition as in claim 8, wherein the Taber Abrasion value of the composition is no greater than about 6 when subjected to ASTM test D4060-84 using a CS-17 abrasive wheel and a 1000 gram weight.

16. The polyamide molding composition as in claim 8, which further comprises at least one component selected from fillers, colorants, modifiers, and stabilizing agents.

17. A molded part having high strength and low wear properties consisting essentially of a composition which comprises the following components, based on the total weight of the composition:
   (a) between about 10 to about 15 weight percent of an aluminosilicate ceramic fiber comprising from about 43 to about 48 weight percent $Al_2O_3$ and from about 54 to about 50 weight percent of $SiO2$ based on the total weight of the aluminosilicate ceramic fiber; and
   (b) between about 90 to about 85 weight percent of nylon 66; and
wherein the Taber Abrasion value of the polyamide molding composition is no greater than about 6 when subjected to ASTM test D4060–84 using a CS-17 abrasive wheel and a 1000 gram weight.

18. A molded part as in claim 17, wherein said aluminosilicate ceramic fiber is present in an amount of about 12 weight percent.

19. A molded part as in claim 17, wherein the aluminosilicate ceramic fiber has a fiber content of greater than 95%.

20. A molded part as in claim 17, wherein the tensile strength of the composition is greater than about 10,000 psi according to ASTM standard D638 the heat deflection temperature is greater than about 77° C. according to ASTM standard D648, and the flexural modulus is greater than about 450,000 psi according to ASTM standard D790.

21. A molded part as in claim 17, wherein the Taber Abrasion value of the composition is no greater than about 5 when subjected to ASTM test D4060–84 using a CS-17 abrasive wheel and a 1000 gram weight.

22. A molded part as in claim 17, wherein the aluminosilicate ceramic fiber has an average nominal diameter of about 0.8 to 1.2 microns and an average length of about 100 microns.

23. A molder part as in claim 17, which further comprises at least one component selected from fillers, colorant, modifiers, and stabilizing agents.

24. A polyamide molding composition exhibiting high mechanical strength and low wear properties comprising, based on the total weight of the composition:
   (a) between about 10 to about 15 weight percent of an aluminosilicate ceramic fiber comprising from about 43 to about 48 weight percent $Al_2O_3$ and from about 54 to about 50 weight percent $SiO_2$ based on the total weight of the aluminosilicate ceramic fiber; and (b) between about 90 to about 85 weight percent of a polyamide; and wherein the aluminosilicate ceramic fiber has an average nominal diameter of about 0.8 to 1.2 microns, and wherein the polyamide molding composition exhibits high mechanical strength and low wear properties and has a Taber mechanical strength and low ear properties and has a Taber Abrasion value of no greater than about 6 when subjected to ASTM test D4060-84 using a CS-17 abrasive wheel and 1000 gram weight.

25. The polyamide molding composition as in claim 24, wherein said aluminosilicate ceramic fiber is present in an amount of about 12 weight percent.

26. The polyamide molding composition as in claim 24, wherein the aluminosilicate ceramic fiber has a fiber content of greater than 95%.

27. The polyamide molding composition as in claim 24, wherein the tensile strength of the composition is greater than about 10,000 psi according to ASTM standard D638, has a flexural modulus of greater than about 450,000 psi according to ASTM standard D790, and a heat deflection temperature of greater than about 77° C. according to ASTM standard D648.

28. The polyamide molding composition as in claim 24, wherein the Taber Abrasion value of the composition is no greater than about 5 when subjected to ASTM test D4060-84 using a CS-17 abrasive wheel and 1000 gram weight.

29. The polyamide molding composition as in claim 24, which further comprises at least one component selected from fillers, colorants, modifiers, and stabilizing agents.

30. A wear composition comprising a polyamide and an effective amount of an aluminosilicate ceramic fiber comprising from about 43 to about 48 weight percent $Al_2O_3$ and from about 54 to about 50 weight of $SiO_2$ based on weight of aluminosilicate ceramic fiber to achieve a Taber Abrasion value of no greater than about 6 when the composition is subject to ASTM test D4060-84 using a CS-17 abrasive wheel and a 1000 gram weight.

* * * * *

UNITED STATES PATENT AND TRADEMARK OFFICE
CERTIFICATE OF CORRECTION

PATENT NO.  : 5,147,918                                  Page 1 of 2
DATED       : September 15, 1992
INVENTOR(S) : Karen L. Price It is certified that error appears in the above-identified patent and that said Letters Patent is hereby corrected as shown below:

Column 2, line 45, delete "comparable" and insert --compatible--;

line 68, change "($AL_2O_3$)" to read --($Al_2O_3$)--.

Column 3, line 13, after "example" insert --,--;

line 31, before "the" change the "o" to read --of--.

Column 5, line 17, change "psi The" to read --psi. The--.

Column 10, Claim 17, line 8, change "SiO2" to read --$SiO_2$--.

Column 10, Claim 23, line 1, change "molder" to --molded--.

UNITED STATES PATENT AND TRADEMARK OFFICE
CERTIFICATE OF CORRECTION

PATENT NO. : 5,147,918
DATED : September 15, 1992
INVENTOR(S) : Karen L. Price

It is certified that error appears in the above-indentified patent and that said Letters Patent is hereby corrected as shown below:

Column 11, Claim 24, line 6, delete "and";
    delete line 7 in its entirety.

Signed and Sealed this

Fourteenth Day of September, 1993

Attest:

BRUCE LEHMAN

*Attesting Officer*   *Commissioner of Patents and Trademarks*